A. M. GRAY.
DYNAMO ELECTRIC MACHINE.
APPLICATION FILED SEPT. 30, 1909.

1,087,166.

Patented Feb. 17, 1914.

Witnesses
John L. Johnson
Chas. L. Byron

Inventor
Alexander M. Gray
By Chas. E. Lord
Attorney

UNITED STATES PATENT OFFICE.

ALEXANDER M. GRAY, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,087,166.  Specification of Letters Patent.  Patented Feb. 17, 1914.

Application filed September 30, 1909. Serial No. 520,349.

*To all whom it may concern:*

Be it known that I, ALEXANDER M. GRAY, a subject of the King of England, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines and more specifically to means for ventilating such machines.

In order to keep the temperature of dynamo-electric machines within certain prescribed limits, it is customary to provide them with some means of ventilating, such as a fan blade construction by means of which a forced circulation of air is created. In constructing induction motors particular attention must be paid to ventilating means in order to keep the coils or windings reasonably cool.

With this end in view the object of my invention is to so construct dynamo-electric machines, spacing the various parts in such manner, as to create and permit a circulation of air which will keep the parts from becoming overheated, especial attention being paid to the windings.

Figure 1:
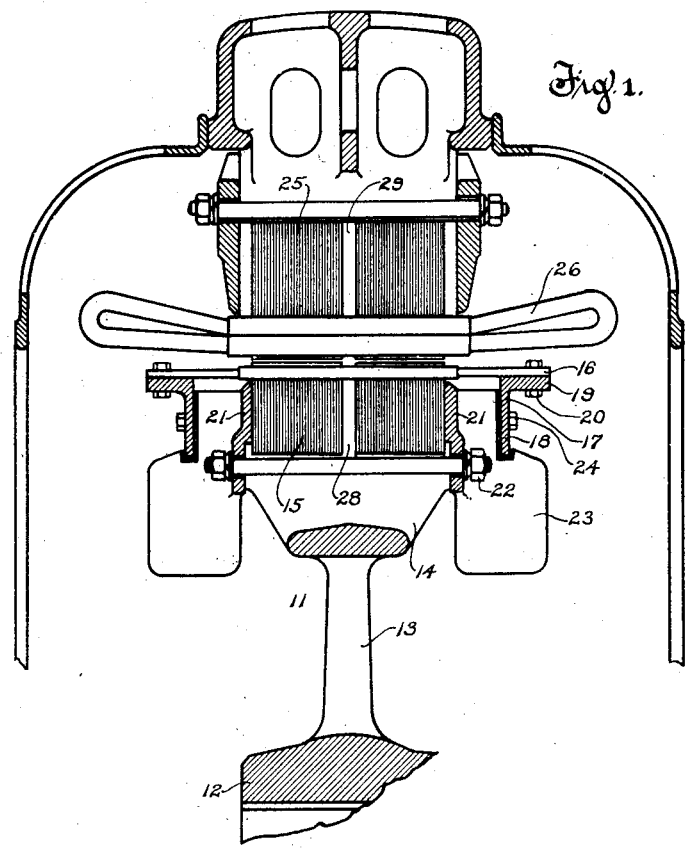
Figure 2:
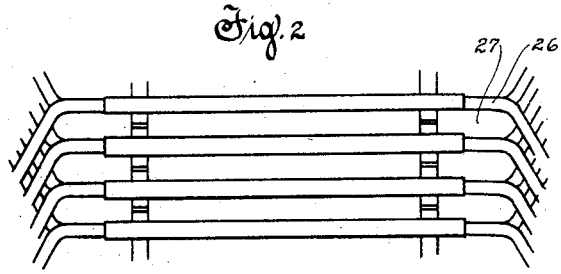

Referring to the accompanying sheet of drawings Figure 1 is a longitudinal sectional view of a squirrel cage induction motor embodying my invention; and, Fig. 2 is a fragmentary view of a group of stator conductors arranged and spaced in accordance with my invention.

I have shown the spider 11 of an induction motor which consists essentially of a hub 12, radial arms 13, and rim 14, on which is mounted a laminated core 15. The core is provided with ventilating air ducts 28, and the usual slots in which are mounted conductor bars 16, which extend beyond each side of the core in the usual manner. The ends of the conductor bars at each side of the machine are connected by a short circuiting ring 17. The rings in this case are of the shape of angle sections, each having one vertical portion 18 at right angles to the axis of the machine and a circular portion 19 at right angles to the vertical portion. Each conductor bar is connected to the short circuiting rings by bolts 20. The rotor core is supported at its sides by end plates 21 which retain the laminæ of said core by bolts 22. As is clear from the drawing the end plates 21 are provided preferably with integrally formed fan blades 23 which support the short circuiting rings, the vertical portions 18 of the rings engaging notched portions of the blades. The fan blades 23 are located between the end plates 21 and the vertical portion 18 of the short circuiting rings and are insulated from and secured to the latter by bolts 24 to prevent the conductors 16 from shifting from side to side. The fans act as spacing members to form air passageways between the end plates and short circuiting rings to permit a flow of air.

Surrounding the rotor is the stator, the laminated core 25 of which is provided with air ducts 29 communicating with the rotor air ducts 28, and with the usual alternating current windings having end-turns 26 which extend beyond the core and which surround the ends of the conductor bars and the short circuiting rings. The projecting end-turns 26 of the winding are extended longitudinally beyond the ends of the core a greater amount than in the usual construction in order to provide air passageways 27 for the circulation of air currents to cool said windings.

When the rotor is set in motion currents of air are created by the action of the rotor and also by the fan blades. The flow of air caused by the action of the rotor takes a path through the ducts 28 in the rotor core and through the communicating ducts 29 in the stator core. The currents of air created by the action of the fan blades are driven through the air passageways formed between the end plates and short-circuiting rings, not only cooling the rotor bars and short-circuiting rings but also cooling the end-turns of the stator coils while passing through the air passageways 27 formed by said stator coils. By means of this construction and arrangement of parts the various members of the machine are kept comparatively cool affording high efficiency and preventing any dangerous overheating.

I aim in my claims to cover all modifications which do not involve a departure from the spirit and scope of my invention.

What I claim as new is:—

1. In an induction motor, a stator core having slots and windings in said slots, said windings having straight portions extending beyond the stator core in alinement with the slots for a considerable distance whereby ventilating passageways are formed between adjacent extended straight portions, a rotor having a plurality of spaced conductor bars, short-circuiting rings to which said bars are connected, and fan blades on the rotor disposed radially inward relatively to said conductor bars and adapted to cause a flow of air through said ventilating passageways when said rotor is in motion.

2. In a dynamo-electric machine, a rotor provided with conductors at its periphery extending beyond the end of the rotor core and spaced apart so as to leave passageways between adjacent conductors beyond said core, a stator core provided with windings having portions extending parallel to the axis of the machine and curved end portions, the portions parallel to the axis of the machine extending beyond the end of the stator core and being spaced apart to form unobstructed radial passageways between circumferentially adjacent conductors, the latter passageways radially alining with the passageways between the rotor conductors during the operation of the machine, and fan means on the rotor located within the extensions of the rotor conductors to force air through the extended parts of the rotor and stator conductors.

3. In a dynamo-electric machine, a stator core having slots and windings in said slots, said windings having straight portions extending beyond the stator core in alinement with the slots for a considerable distance, whereby passageways are formed between adjacent extended straight portions, a rotor, and fan means on said rotor disposed radially inward relatively to the extended straight portions of said windings and adapted to cause a flow of air through said passageways when said rotor is in motion.

In testimony whereof I affix my signature, in the presence of two witnesses.

ALEXANDER M. GRAY.

Witnesses:
CHAS. L. BYRON,
ROB. E. STOLL.

---

Copies of this patent may be obtained for five cents each, by addressing the "Commissioner of Patents, Washington, D. C."